United States Patent [19]

Masuko

[11] Patent Number: 4,512,000
[45] Date of Patent: Apr. 16, 1985

[54] OBJECT DETECTOR WHICH COMPARES RETURNED SIGNALS FROM SUCCESSIVE TRANSMISSIONS

[75] Inventor: Akinori Masuko, Fukaya, Japan

[73] Assignee: Tokyo Shibaura Denki Kabushiki Kaisha, Kawasaki, Japan

[21] Appl. No.: 332,296

[22] Filed: Dec. 18, 1981

[30] Foreign Application Priority Data

Dec. 23, 1980 [JP] Japan ................................ 55-182363
Apr. 17, 1981 [JP] Japan ................................. 56-57928

[51] Int. Cl.³ ............................................ G08B 13/16
[52] U.S. Cl. .................................... 367/93; 340/552; 343/5 PD
[58] Field of Search .......................... 367/93; 340/552; 343/5 PD

[56] References Cited

U.S. PATENT DOCUMENTS 4,382,291  5/1983  Naknuchi .......................... 343/5 PD

FOREIGN PATENT DOCUMENTS 0018206 10/1980 European Pat. Off. .
1463806  2/1977 United Kingdom .
1517628  7/1978 United Kingdom .
1580647 12/1980 United Kingdom .
1580406 12/1980 United Kingdom .
1601604 11/1981 United Kingdom .

OTHER PUBLICATIONS

Skolnik, "Radar Handbook", pub. 1970, McGraw-Hill, Chapter 17 (especially sections 17.1, 17.8, 17.9, 17.10), William W. Shrader.

Primary Examiner—Glen R. Swann, III
Attorney, Agent, or Firm—Cushman, Darby & Cushman

[57] ABSTRACT

A transmitting section periodically radiates a signal wave. A receiving section receives the signal wave radiated from the transmitting section and reflected from the monitored region to produce the received signal. A sampling circuit samples the output signal from the receiving section at given time intervals. A memory stores the output signal from the sampling circuit at the time of one period of transmission, and a judging circuit compares the output signal from the sampling circuit at each transmission with the signal previously stored in the memory to detect a change in a state of an object to be detected.

14 Claims, 30 Drawing Figures

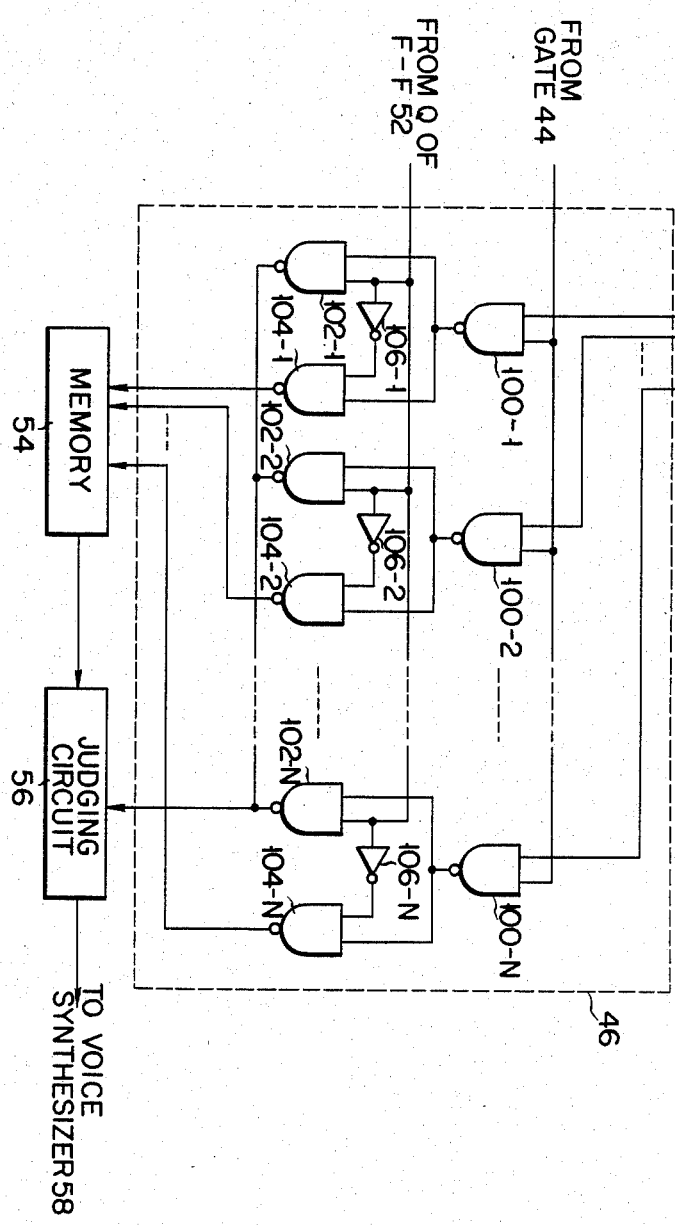
F I G. 3

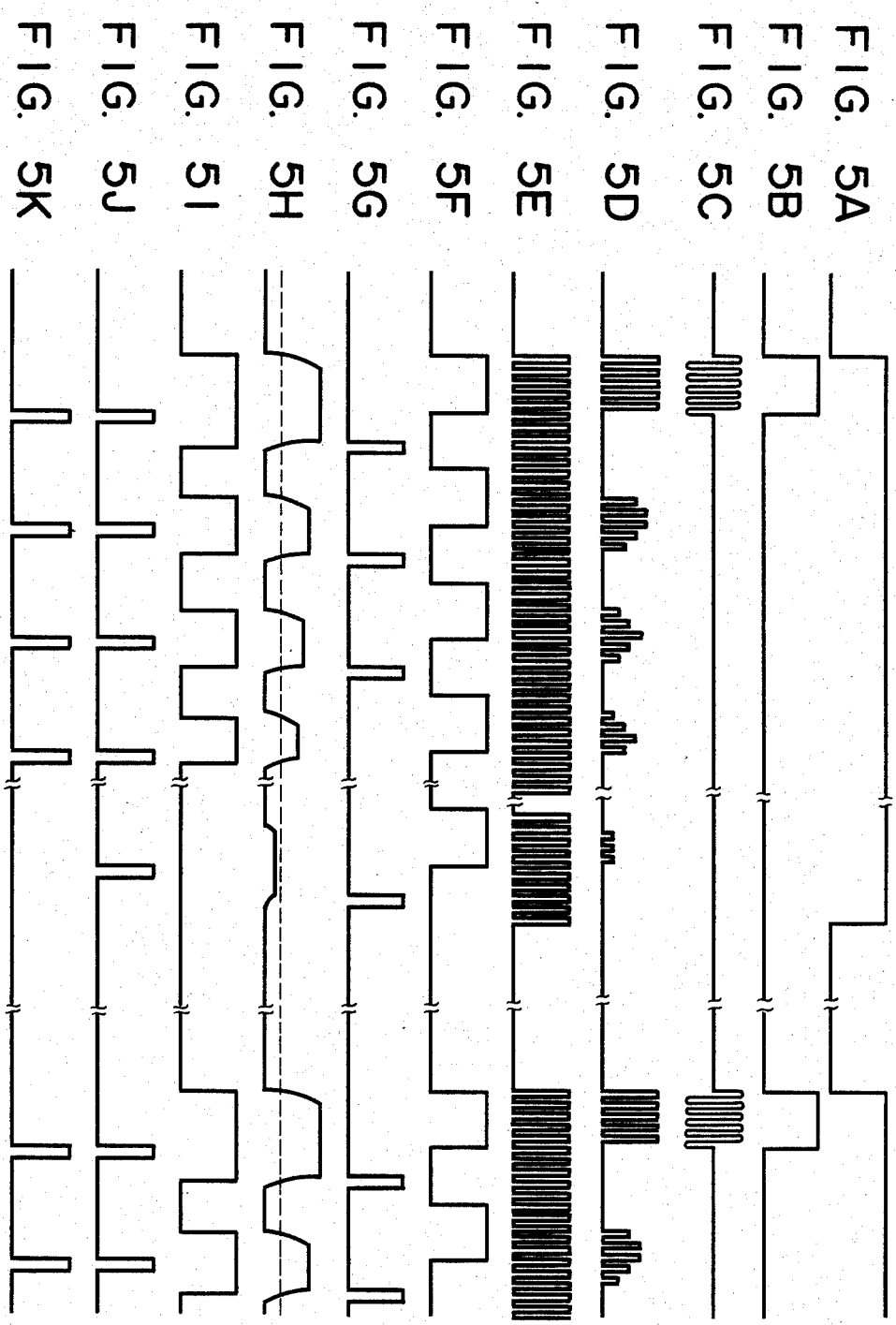

OBJECT DETECTOR WHICH COMPARES RETURNED SIGNALS FROM SUCCESSIVE TRANSMISSIONS

BACKGROUND OF THE INVENTION

The present invention relates to an object detecting apparatus for detecting the distance to an object and the presence or absence of the object.

It has been known to detect the distance to an object by measuring a time interval from an instant that light, acoustic wave, microwave, or the like is projected onto an object until the portion of the wave reflected by the object is returned to the wave projecting point. In an application of this method, it is possible to detect the presence or absence of an object by comparing the measured time with a reference time. Recently, object detecting devices based on such methods have found a wide use in a variety of fields. A television set incorporating the object detecting apparatus will be described. It is generally said that an optimum distance between the TV set and a human viewer for watching the television is five to seven times the longitudinal length of the TV set to protect the eyes of the viewer. In viewing the television, the viewer tends to unconsciously excessively approach the television screen. To cope with this problem, it is recommendable to install in a TV set an object detecting apparatus which is designed so as to operate in the following way. When a viewer approaches the TV screen closer than a given distance, the object detecting apparatus issues an alarm, while continuously checking the distance between the viewer and the TV set. The alarm may comprise a voice saying "You are too close to the TV set! Move away a little" produced by a voice synthesizer. Coversely, when the viewer moves away from the TV set beyond another given distance, the object detecting apparatus turns off the power switch of the TV set, judging that the viewer has ceased to watch the TV. Further, when the viewer approaches the TV set within that distance, the apparatus automatically turns on the power switch. This approach is very useful in that it protects the eyes of viewer and saves the electric power.

Generally, in a room with the TV set, there are many objects such as a chair, desk, bookshelf and the like, in addition to a human viewer. When using the object detecting apparatus, it is difficult to strictly discriminate the wave reflected by the viewer from waves reflected by the other objects. This discrimination is roughly possible because the amplitude of the reflecting wave depends on a size of the object. However, when the size of the object is comparable to that of the viewer, the discrimination is almost impossible.

SUMMARY OF THE INVENTION

Accordingly, an object of the present invention is to provide an object defecting apparatus for detecting the presence or absence of a desired object from a plurality of objects and the distance to the desired object. The object detecting apparatus in accordance with the present invention comprises a transmitting section for periodically projecting a signal wave, a receiving section for receiving the signal wave radiated from the transmitting section to produce a received signal, a sampling circuit for sampling the received signal at given time intervals, a memory for storing previous output signals from the sampling circuit at the time of one period of transmission, and a judging circuit for comparing the output signal from the sampling circuit at the time of each period of the transmission with signal from the memory.

BRIEF DESCRIPTION OF THE DRAWINGS

FIG. 3 is a circuit diagram of a selection gate circuit used in the circuit of FIG. 1;

FIGS. 4A to 4G and 5A to 5K are timing charts illustrating the sequence of operations of the embodiment of FIG. 1;

DETAILED DESCRIPTION OF THE PREFERRED EMBODIMENT

Figure 1:
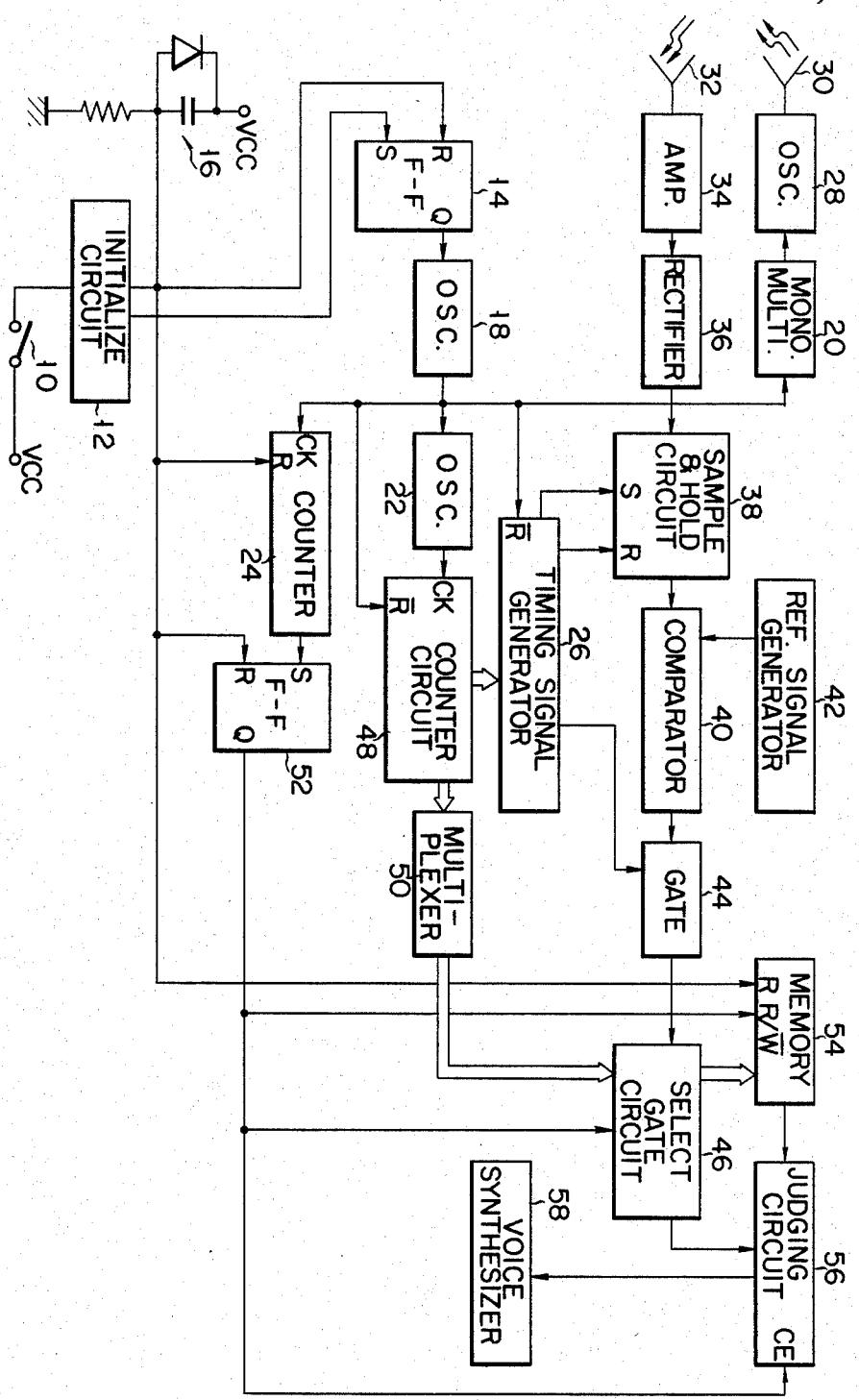
FIG. 1 is a block diagram illustrating an electrical circuit of an embodiment of an object detecting apparatus according to the present invention.

An embodiment of an object detecting apparatus according to the present invention will be described referring to FIG. 1, which shows a block diagram of the embodiment. In the embodiment, the object detecting apparatus is used with a television receiver set. A switch 10, closed by a button (not shown), is connected to an input terminal of an initializing circuit 12. First and second output terinals of the initializing circuit 12 are respectively connected to the input terminals R and S of an RS flip-flop 14. The output terminal of a power-on reset circuit 16 connected to a power source $V_{cc}$ is also connected to the first output terminal of the initializing circuit 12. The output terminal Q of the RS flip-flop 14 is connected to the enable terminal of an oscillator 18. An output terminal of the oscillator 18 is connected to an input terminal of a monostable multivibrator 20, the enable terminal of an oscillator 22, a clock terminal CK of a counter 24, and a reset terminal $\overline{R}$ of a timing signal generator 26. Therefore, the timing signal generator 26 is reset at the time of trailing edge of the output signal of the oscillator 18. An oscillating frequency of the oscillator 22 is higher than that of the oscillator 18. The output terminal of the monostable multi-vibrator 20 is connected to the enable terminal of an oscillator 28. An oscillating frequency of the oscillator 28 is set at a frequency within an ultrasonic wave frequency band from 40 to 60 kHz. The output signal from the oscillator 28 is radiated into the air through a speaker 30. A microphone 32 for receiving the ultrasonic wave reflected from objects is disposed near the speaker 30. The output signal from the microphone 32 is applied through an amplifier 34 to a rectifier circuit 36. The output signal from the rectifier circuit 36 is applied to a sample & hold circuit 38. A sampling signal and a reset signal, derived from the timing signal generator 26, are respectively applied to a sample terminal S and reset terminal R of the sample & hold circuit 38. The output terminal of the sample & hold circuit 38 is connected to a first input terminal of a comparator 40. The output terminal of a reference signal generator 42 is connected to a second input terminal of the comparator 40. An output signal from the comparator 40 is supplied through a gate 44 to an input terminal of a select gate circuit 46. The select gate circuit 46, having first and second output terminals, passes the input signal through either of the first and second output terminals, selectively. A gate signal is supplied from the timing signal generator 26 to a control terminal of the select gate circuit 44.

The output terminal of the oscillator 22 is connected to a clock terminal CK of a counter circuit 48. The output terminal of the oscillator 18 is connected to a reset terminal $\overline{R}$ of the counter circuit 48. The output signal of counter circuit 48 is supplied to the timing signal generator 26 and a multiplexer 50. Therefore, the counter circuit 48 is reset when the output signal from the oscillator 18 is low (logic level 0). The output signal from the multiplexer 50 is supplied to a control terminal of the select gate circuit 46. The output terminal of predetermined bits of the counter 24 is connected to a set terminal S of an RS flip-flop 52. The first output terminal of the initializing circuit 12 is connected to a reset terminal R of the counter 24 and the flip-flop 52. The output terminal Q of the RS flip-flop 52 is connected to a control terminal of the select gate circuit 46, a read/write terminal $R/\overline{W}$ of a memory 54 and a chip enable terminal CE of a judging circuit 56. The first output signal from the select gate circuit 46 is a parallel signal including a plurality of bits. The signals of the plurality of bits are supplied to respective addresses in the memory 54. The second output signal is a serial signal of one bit supplied to a first input terminal of the judging circuit 56. The first output terminal of the initializing circuit 12 is connected to a reset terminal R of the memory 54. The memory 54, formed by a shift register of the parallel-in and parallel-out type, for example, sequentially produces data in each address. The output terminal of the memory 54 is connected to a second input terminal of the judging circuit 56. The output signal from the judging circuit 56 is connected to a voice synthesizer 58.

Figure 2:
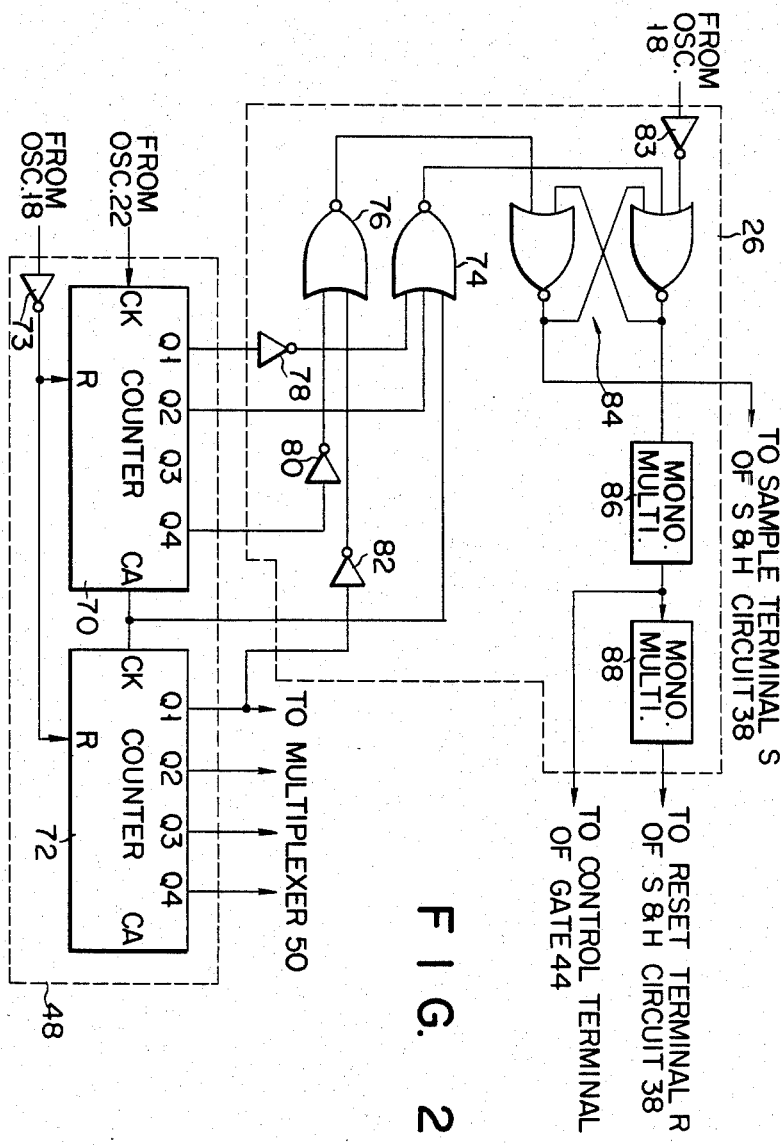
FIG. 2 is a circuit diagram of a timing signal generator used in the circuit shown in FIG. 1.

FIG. 2 shows a circuit diagram of a practical arrangement of the counter circuit 48 and the timing signal generator 26 shown in FIG. 1. The counter circuit 48 is comprised of a couple of 4-bit binary counters 70 and 72 connected in series, and an inverter 73. The timing signal generator 26 is comprised of NOR gates 74 and 76, inverters 78, 80, 82 and 83, an RS flip-flop 84, and monostable multivibrators 86 and 88. The output terminal of the oscillator 22 is connected to the clock terminal CK of the counter 70. The output terminals Q1 and Q4 of the counter 70 are connected to first input terminals of the NOR gates 74 and 76, through the inverters 78 and 80, respectively. The output terminal Q2 of the counter 70 is connected to a second input terminal of the NOR gate 74, and a carry output terminal CA is connected to a third input terminal of the NOR gate 74, and the clock terminal CK of the counter 72. The output terminal Q1 of the counter 72 is connected through the inverter 82 to a second input terminal of the NOR gate 76. The output terminals Q1, Q2, Q3 and Q4 are connected to the multiplexer 50. The output terminal of the oscillator 18 is connected to the reset terminal R of each of the counters 70 and 72 through the inverter 73.

The output terminals of the NOR gates 74 and 76 are respectively connected to the reset terminal R and the set terminals S of the flip-flop 84, respectively. The output terminal of the oscillator 18 is connected to the reset terminal R of the flip-flop 84 through the inverter 83. The output terminals Q and $\overline{Q}$ of the flip-flop 84 are respectively connected to the sample terminal S of the sample & hold circuit 38 and the input terminal of the monostable multivibrator 86. The output terminal of the monostable multivibrator 86 is connected to the control terminal of the gate 44 and the input terminal of the monostable multivibrator 88. The output terminal of the monostable multivibrator 88 is connected to the reset terminal R of the sample & hold circuit 38.

FIG. 3 shows a circuit diagram of a practical arrangement of the select gate circuit 46 shown in FIG. 1. The multiplexer 50 has N output terminals which are respectively connected to first input terminals of NAND gates 100-1, 100-2, ..., 100-N, respectively. The output terminal of the gate 44 is connected to second input terminals of the NAND gates 100-1, 100-2, ..., 100-N. The output terminals of the NAND gates 100-1, 100-2, ..., 100-N are connected to first input terminals of NAND gates 102-1, 102-1, ..., 102-N, respectively. The output terminals of the NAND gates 100-1, 100-2, ..., 100-N are also connected to first input terminals of NAND gates 104-1, 104-2, ..., 104-N, respectively. The output terminal Q of the flip-flop 52 is directly connected to second input terminals of the NAND gates 102-1, 102-2, ..., 102-N, and is connected to second input terminals of NAND gates 104-1, 104-2, ..., 104-N, through inverters 106-1, 106-2, ..., 106-N, respectively. The output terminals of the NAND gates 102-1, 102-2, ..., 102-N are connected together and the common connection point is further connected to the first input terminal of the judging circuit 56. The memory 54, containing N cells, stores the output signals from the NAND gates 104-1, 104-2, ..., 104-N in the corresponding cells. The output signal from the memory 54 is connected to the second input terminal of the judging circuit 56.

Figures 4A, 4B, 4C, 4D, 4E, 4F, 4G:
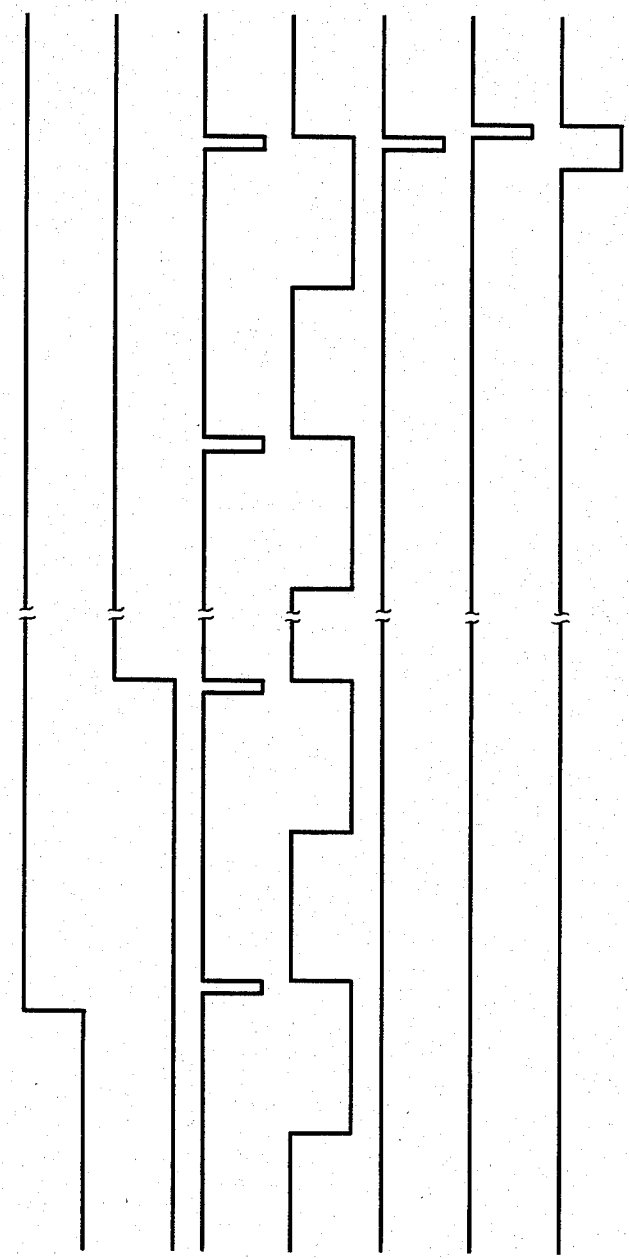

The operation of the above-mentioned embodiment will be described referring to a timing chart shown in FIGS. 4A to 4G and 5A to 5K. As described below, a feature of the present embodiment is that discrimination of a human (a moving object) from stationary objects is possible by storing locations of objects (containing a human) in front of a TV set during a predetermined period, i.e., during several periods of the oscillator 18 and comparing the stored location and each measured location after the predetermined period. Upon turning the power on, the power on reset circuit 16 produces a reset pulse at logic "1" level to reset the flip-flop 14, the counter 24, the flip-flop 52 and the memory 54. The data in the respective cells in the memory 54 are cleared to "0" (logic "0" level). Since logic "0" (referred to as L level) appears at the output terminal Q of the flip-flop 14, the oscillator 18 is in a reset state. A button (not shown) in depressed for storing the locations of the objects. The switch 10 is closed so long as it is pushed. A signal supplied from the switch 10 is at logic "1" (referred to as H level) during a period that the button is depressed, as shown in FIG. 4A. In synchronism with the leading edge of the input signal, the initializing circuit 12 produces a reset pulse at H level as shown in FIG. 4B, at the first output terminal. By the reset pulse, the flip-flop 14, the counter 24, the flip-flop 52, and the memory 54 are again reset (making doubly sure that they are reset). The initializing circuit 12 synchronizes with the trailing edge of the reset pulse to supply the set pulse at H level as shown in FIG. 4C to the input terminal S of the flip-flop 14, from its second output terminal. As a result, the flip-flop 14 is set, so that the signal at the output terminal Q is at H level, and the oscillator 18 is set. So long as the power source is not turned off, the oscillator 18 is not reset. The oscillator 18 starts to oscillate to produce an oscillating signal as shown in FIG. 4D. The oscillating frequency is set at 1 Hz, that is, the period is set at 1 sec. When the oscillating signal is supplied to the monostable multivibrator 20, the multivibrator 20 produces a pulse signal with a given pulse width, as show in FIG. 4E in synchronism with the leading edge of the oscillating signal from the oscillator 18. The pulse width is set at 1 msec, for example. The oscillator 28 produces an oscillating signal at 40 to 60 kHz, as shown in FIG. 5C, during a period that the output signal from the monostable multivibrator 20 is at H level. FIGS. 4A and 5B respectively illustrate output signals from the oscillator 18 and monostable multivibrator 20 arranged along time axes expanded with respect to those shown in FIGS. 4D and 4E. The oscillating ultrasonic wave is radiated through the speaker 30 into a space in front of a TV set. The duration of the ultrasonic radiation corresponds to the pulse width, i.e. 1 ms, of the output signal from the monostable multivibrator 20. A resolution in a radial direction to the object is better as the radiation time of the ultrasonic wave is shorter. When considering response characteristics of the speaker 30 and the microphone 32, about 1 ms is a proper radiation time. Even in this case, 15 to 30 cm of the resolution is obtained.

The ultrasonic wave radiated from the speaker 30 is reflected at a human, and stationary objects such as a desk, a chair, a box, etc. in front of the TV set. The reflected ultrasonic wave is received by the microphone 32 and the received signal is amplified by the amplifier 34. The output signal from the amplifier 34 is rectified by the rectifier 36 and only a positive component is produced from the rectifier 36, as shown in FIG. 5D. Of the received signals obtained as the result of one time ultrasonic wave radiation, a group of the signals first received are not the reflecting wave from the objects but a direct wave from the speaker 30.

The output signal (FIGS. 5A or 4D) from the oscillator 18 is supplied to the oscillator 22, and since the oscillating frequency from the oscillator 22 is set at a value higher than that of the oscillator 18, the oscillator 22 oscillates so long as the oscillating output signal from the oscillator 18 is in H level as shown in FIG. 5E. The output pulse signal from the oscillator 22 is frequency-divided by the counter 48. A plurality of output pulse signals which are frequency-divided at respective dividing ratios as shown in FIG. 2 are supplied to the timing signal generator 26. On the basis of the output pulse signals from the counter circuit 48, the timing signal generator 26 supplies the sampling pulse signals with the given number of pulses during a period that the output signal from the oscillator 18 is in H level to the sample terminal S of the sample & hold circuit 38, as shown in FIG. 5F. The number of the pulses is equal to the N used in FIG. 3. The sample & hold circuit 38 samples and holds the output signal from the rectifier 36 in accordance with the sampling pulses. The sampling of the reflected signal in the time axis direction corresponds to the sampling in the distance direction. The pulse width of the sampling pulse is set at a value not longer than the output pulse from the monostable multivibrator 20. The timing signal generator 26 produces the sampling pulses on the basis of the output signals from the counter circuit 48. During rest periods of the sampling pulses, it supplies the reset pulses as shown in FIG. 5G to the reset terminal R of the sample & hold circuit 38. As a result, the sample & hold circuit 38 detects a maximum value of the reflected signal during each sampling period. Thus, the sample & hold circuit 38 produces a signal as shown in FIG. 5H. The output signal from the sample & hold circuit 38 is compared with the output reference signal from the reference signal generator 42 as shown by a broken line in FIG. 5H. A pulse signal as shown in FIG. 5I with a pulse width equal to the period in which the holded signal is higher than the reference signal is supplied to the gate 44. That is, the reflected signal below the reference level is removed in the comparator 40, so that the influence of a variation, etc. of the receiving sensitivity of the microphone 32 is eliminated.

The timing signal generator 26 supplies to the control terminal of the gate 44 a gate signal the pulse width of which is determined by a time constant of the monostable multivibrator 86 (FIG. 2). As a result, the received signal, as shown in FIG. 5K, which is quantitized by the sample & hold circuit 38 and the comparator 40, is supplied through the gate 44 to the select gate circuit 46. Therefore, the received quantitized signal obtained through one time transmission of the ultrasonic wave is a pulse signal having pulses at timings in accordance with a distance to the object.

A flow of the received signal supplied to the select gate circuit 46 will be described referring to FIG. 3. The output pulse signal (FIG. 4D) from the oscillator 18 is counted by the counter 24. Assume now that the counter 24 does not count up to the predetermined value and is not yet operated to produce count outputs. In this embodiment, the counter 24 produces the output signal where the content of the counter 24 reaches "3". At this time, the Q output signal from the flip-flop 52 is in L level, as shown in FIG. 4F. Accordingly, the NAND gates 102-i (i=1, 2, ..., N) in the select gate circuit 46 have an L level applied to the second input terminal, and the NAND gate 104-i is in H level at the second input terminal. The signal from the gate 44 (FIG. 5K) is supplied to the second input terminal of the NAND gate 100-i. At this time, the multiplexer 50 responds to the signal from the counter 72 (FIG. 2) to supply sequentially H level signals to the first input terminals of the NAND gates 100-1, 100-2, ..., 100-N, and selects one specific NAND gate 100-i. Therefore, the output signal from the gate 44 appears at only the output terminal of the selected NAND gate 100-i being inverted. The signals at the output terminals of the NAND gates not selected are in H level. The period for switching the selection is set at a value equal to the sampling period of the sample & hold circuit 38. Therefore, the respective components of the received signal in accordance with the lapse of time from the transmission are inverted and allowed to sequentially pass the NAND gates 100-1, 100-2, ..., 100-N. Since the signal at the second input terminal of the NAND gate 104-i connected to the memory 50 is in H level, the output signal from the selected NAND gate 100-i is inverted and appears at the output terminal of the NAND gate 104-i. The memory 54 is in a write mode when the read/write terminal R/$\overline{W}$ is at L level. Therefore, the output pulses from the gate 44 given by one time transmission are sequentially stored in the corresponding cells in the memory 54. On the other hand, the output terminals of the NAND gates 102-i are all in H level. Where the Q output terminal is in L level, the chip enable terminal CE of the judging circuit 56 is also in L level. The judging circuit 56 produces an L level signal, as shown in FIG. 4G. Similarly, the pulses given by the succeeding transmission are also stored in the memory 54, superposedly. Subsequently, this operation is repeated. Note here that since the received signals for the respective transmissions are stored in a superposed manner, the object, even if it has failed to be detected by one time transmission, can surely be detected. The signal representing each object is formed by one bit when an object is present, that is, the level of the signal is H. Hence, many times of storages of H level causes no problem to arise.

After a predetermined number of transmissions, that is, after the counter 24 for counting the output pulses from the oscillator 18 counts a given number of pulses, e.g. three pulses, the flip-flop 52 is set. The Q output signal of the flip-flop 52 becomes H in level, as shown in FIG. 4F, and the memory 54 is in a read mode. At this point, the storing operation of the objects is completed. Since the transmission continues, the received pulses as shown in FIG. 5K are supplied from the gate 44 to the select gate circuit 46. Likewise, the multiplexer 50 sequentially selects the NAND gate 100-i (i=1, 2, ..., N). Since the Q output signal from the flip-flop 52 is H in level, the output signal from the selected NAND gate 100-i is inverted through the NAND gate 102-i, this time. The output pulses from the gate 44 are sequentially supplied to the first input terminal of the judging circuit 56, through the NAND gates 100-i and 102-i. In a read mode, the memory 54 sequentially produces output signals from the memory cell first stored in synchronism with the switch of the output of the NAND gate 100-i, which are then applied to the second input terminal of the judging circuit 56. The judging circuit 56 is enabled, since the output terminal Q of the flip-flop 52 is in H level. As a result, following the setting of the flip-flop 52, the data stored in the memory 54 is successively compared with the reflected data at the respective transmissions in the judging circuit 56, respectively. The judging circuit 56 produces an H level signal when both the signals are not coincident with each other. The data in the transmission periods are tabulated in the following table. The transmission period contains N sampling periods.

TABLE

| Sampling period | 1 | 2 | 3 | 4 | 5 | 6 | ... N |
|---|---|---|---|---|---|---|---|
| Memory 54 | H | H | H | L | H | L | ... L |
| At first transmission after the set of F-F 52 | H | H | H | L | H | L | ... L |
| At second transmission after the set of F-F 52 | H | H | L | L | L | H | ... L |

As seen from the above table, after setting the flip-flop 52, the received data at the first transmission is coincident with the data of the memory 54. This means that the state of the object remains still unchanged. Of the received data at the second transmission, the data during the third sampling period, fifth sampling period, sixth sampling period, ... are different from the corresponding data in the memory 54. This indicates that a human has moved, changing the reflected signal. The judging circuit 56 produces an H level signal during the second transmission period after the flip-flop 52 is set. The voice synthesizer 58 responds to the output signal from the judging circuit 56 to sound an alarm.

As described above, in the embodiment, states of objects are stored during the given period terminates, i.e. the oscillator 18 produces three pulses, and after that, the stored state is compared with a state of the object at each measuring time, so that it is possible to discriminate a stationary object from a moving human. Since the present embodiment can detect a change of a state (location) of the object, it is applicable for a security system for detecting burglars. In this case, in response to the presence of an invader, the output signal from the judging circuit 56 becomes H in level, sounding an alarm.

The embodiment, however, does not respond to a location of the human. For this reason, the present embodiment is unsatisfactory for its application in the TV set. Another embodiment to solve this problem will be described. In the following embodiment, same reference numerals are used for designating like portions.

Figure 6:
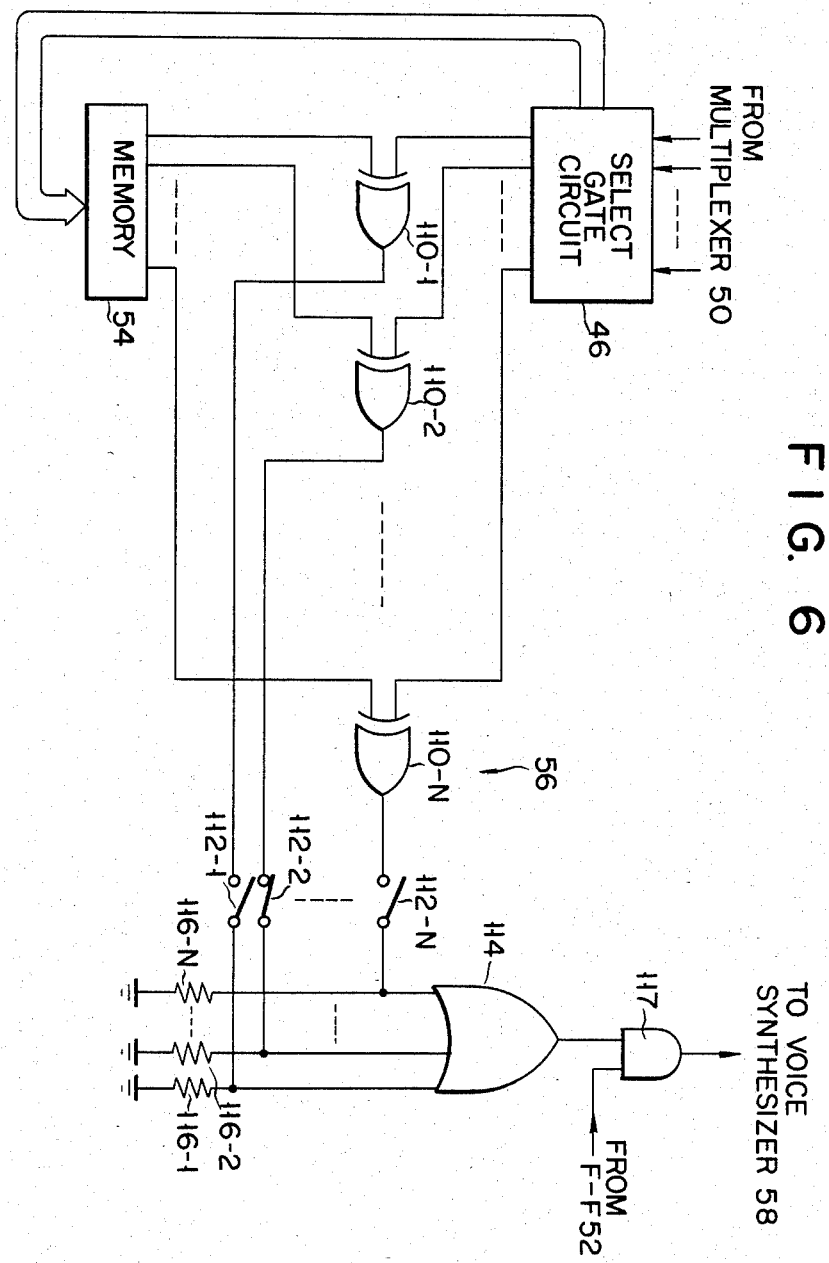
FIG. 6 is a circuit diagram of a main portion of a second embodiment of an object detecting apparatus according to the present invention.

FIG. 6 is a circuit diagram of a second embodiment of the invention. In the figure, the structures in common with the first embodiment are omitted for simplicity. The select gate circuit 46 has first and second output terminals for producing parallel signals. The output terminals of each group are designed for N bits. The bit components of the first output signal of the select gate circuit 46 are supplied to first input terminals of EX-OR gates 110-1, 110-2, ..., 110-N, and the bit components of the second output signal are supplied to the cells of the memory 54, respectively. The data in the cells of the memory 54 are supplied to second input terminals of the corresponding EX-OR gates 110-1, 110-2, ..., 110-N, respectively. The output terminals of the EX-OR gates 110-1, 110-2, ... 110-N are connected through switches 112-1, 112-2, ..., 112-N to the input terminal of an OR gate 114. The connection points of the OR gate 114 and switches 112-1, 112-2, ..., 112-N are grounded through respective resistors 116-1, 116-2, ..., 116-N. The output terminal of the OR gate 114 and the output terminal Q of the flip-flop 52 are connected to an AND gate 117 whose output terminal is connected to the voice synthesizer 58. The EX-OR gates 110, the switches 112, the OR gate 114, the resistors 116, and the AND gate 117 make up the judging circuit 56.

As described above, the reflected signal for each transmission is sampled with respect to a distance (time). Accordingly, for detecting that a viewer is too close to the TV set beyond a given distance, it is satisfactory that only the data sampled at the timing corresponding to the given distance is judged. Since the reflected data is stored in the sampling order, only the reflected data within the given distances are judged by closing only one switch 112-i or switches 112-1 to 112-i while the remaining switches are opened. The remainder of the operation of this embodiment is the same as that of the first embodiment. In this way, the present embodiment can detect the approach of a viewer to the TV set within a given distance. At this time, the voice synthesizer gives not only an alarm and but also a voice message saying "you are too close to the TV set! move away a little". According to the second embodiment, the detecting distance can be changed properly by changing the closing switch 112-i. Further, the power source to the TV receiver circuit may automatically be turned on or off when a human approaches or moves away from the TV set. This feature provides a more convenient TV set. In the application of the embodiment for the security system, the system may be so designed as to sound an alarm when a human approaches to an unsafe close proximity.

Figure 7:
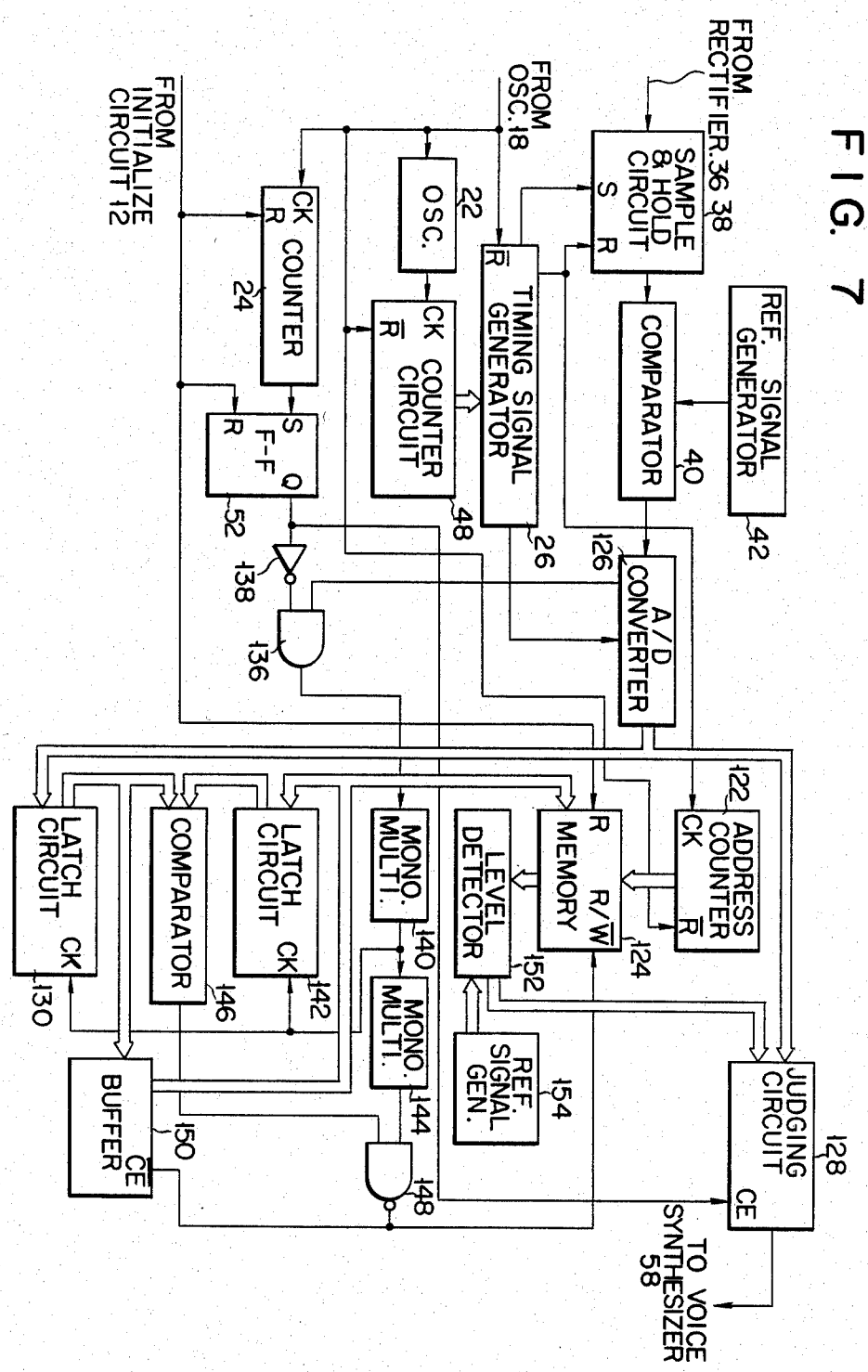
FIG. 7 is a block diagram of an electric circuit of a main portion of a third embodiment of an object detecting apparatus according to the present invention.

In the first and second embodiments, the reflecting pulse is a quantitized signal of one bit. Therefore, the output can express only the presence of an object, and hence the accuracy of the object detection is unsatisfactory. For example, the alarm is issued even when a cat moves. To avoid this problem, the reflected signal must be quantitized by a plurality of bits. This is realized by a third embodiment of the present invention to be described below. A circuit diagram of the third embodiment is illustrated in FIG. 7, in which portions like those of the first embodiment are omitted. The output terminal of the oscillator 18 is connected to a reset terminal R of an address counter 122, and the first output terminal of the initializing circuit 12 is connected to a reset terminal R of a memory 124. The output signal from the comparator 40 is supplied to an input terminal of an A/D converter 126. An A/D start signal produced from the timing signal generator 26 is supplied to the A/D conversion start terminal of the A/D converter 126. The output terminal of the A/D converter 126 is connected to a first input terminal of a judging circuit 128 and the input terminal of a latch circuit 130. The A/D conversion end terminal of the A/D converter 126 is connected to a first input terminal of an AND gate 136. The output terminal Q of the flip-flop 52 is directly connected to a chip enable terminal CE of the judging circuit 128, and is connected through an inverter 138 to a second input terminal of the AND gate 136. A reset signal supplied from the timing signal generator 26 to the sample & hold circuit 38 is also supplied to a clock terminal CK of the address counter 122. The output signal from the address counter 122 is supplied to an address terminal of the memory 124. The output terminal of the AND gate 136 is connected to an input terminal of a monostable multivibrator 140 whose output terminal is connected to clock terminals CK of the latch circuits 130 and 142 and an input terminal of a monostable multivibrator 140. The output terminals of the latch circuits 130 and 142 are respectively connected to first and second input terminals of a comparator 146. The output terminals of the monostable multivibrators 144 and the comparator 146 are connected to first and second input termnals of a NAND gate 148. The output terminal of the NAND gate 148 is connected to a chip enable terminal $\overline{CE}$ of a buffer 150 and a read/write terminal R/$\overline{W}$ of the memory 124. The output signal from the latch circuit 130 is supplied to the buffer 150. The output signal from the buffer 150 is supplied to an input terminal of the latch circuit 142 and a data input terminal of the memory 124. The data output terminal of the memory 124 is connected to a first input terminal of a level detector 152. The output terminal of the reference signal generator 154 is connected to a second input terminal of the level detector 152 of which the output terminal is connected to a second input terminal of the judging circuit 128. The output terminal of the judging circuit 128 is connected to the voice synthesizer 58.

Figures 8A, 8B, 8C, 8D, 8E, 8F, 8G:
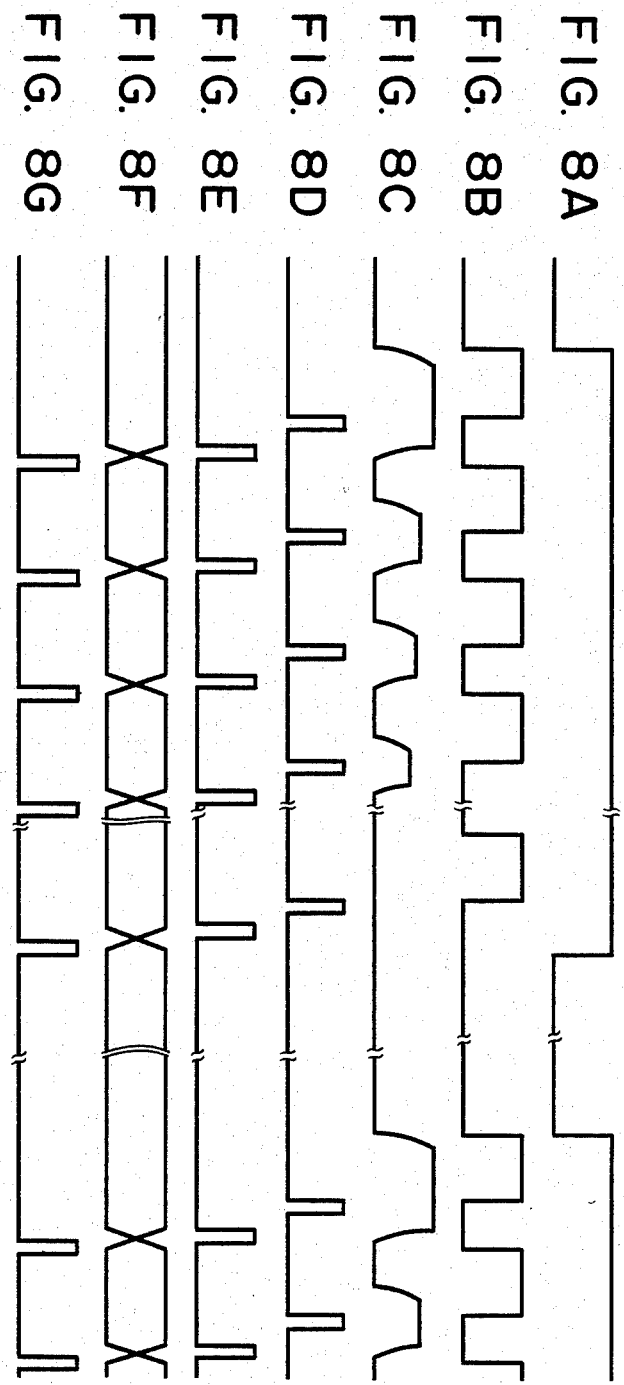
FIGS. 8A to 8G are timing charts useful in explaining the operation of the third embodiment.

The operation of the third embodiment will be described referring to timing charts shown in FIGS. 8A to 8G. Every time the output signal from the oscillator 18 goes to H level, the ultrasonic wave is transmitted and the received signal is sampled and held, as in the first and second embodiments. FIGS. 8A and 8B show the output signal from the oscillator 18 and the sampling signal to the sample & hold circuit 38, which correspond to the waves shown in FIGS. 5A and 5F. Assume that the output signal from the sample & hold circuit 38 is as shown in FIG. 8C. The comparator 40 and reference signal generator 42 prohibit the passage there through of the components of the output signal from the sample & hold circuit 38, which is below the reference value. This prohibition eliminates the influence of noise or the like. The signal generator 26 supplies the A/D conversion start pulse to the A/D converter 126, as shown in FIG. 8D, in synchronism with the trailing edge of the sampling pulse. In response to the start pulse, the A/D converter 12 A/D convertes the output signal (FIG. 8C) of the comparator 40 and in response to the termination of the A/D conversion, supplies the A/D conversion end signal as shown in FIG. 8E to the AND circuit 136, and further produces the result of the A/D conversion as shown in FIG. 8F.

When the times of the transmissions is below a given number, i.e. when the flip-flop 52 is in a reset state, the AND gate 136 is in a conductive state and the judging circuit 128 is in non-operating mode. The A/D conversion end pulse is supplied through the AND gate 136 to the monostable multivibrator 140. The monostable multivibrator 140 supplies a pulse signal as shown in FIG. 8G to the clock terminals CK of the latch circuits 130 and 142 and the monostable multivibrator 144, in synchronism with the trailing edge of the input signal, i.e. the A/D conversion end pulse. The latch circuits 130 and 142 latch the output signal from the A/D converter 126 and the output signal from the buffer 150 in response to the output pulse from the monostable multivibrator 140. The output signals from the latch circuits 130 and 142 are compared to each other by the comparator 146. If it is assumed that the output levels from the latch circuits 130 and 142 are X1 and X2, the comparator produces an L level signal when X1 is equal to or less than X2, and produces an H level signal when X1 is larger than X2.

The output signal from the comparator 146 is in L level, the output signal from the NAND gate 148 is always in H level, and the memory 124 is in a read mode. At this time, the buffer 150 is in a non-operating mode.

When the output signal from the comparator 146 is in H level, the output signal from the NAND gate 148 is made low in level by the H level output pulse signal produced from the monostable multivibrator 144 in synchronism with the trailing edge of the output signal from the monostable multivibrator 140. Accordingly, the buffer 150 is in an operating mode. The output signal from the latch circuit 130 is loaded into the memory 124 and the latch circuit 142 through the buffer 150. When the output signal from the comparator 146 is at H level, the data in the latch circuit 130 is larger than that in the latch circuit 142. Since the output signal from the latch circuit 130 is latched in the latch circuit 142, the signal stored in the memory 124 is the maximum one of those received signals. The address counter 122 is reset when the output signal from the oscillator 18 is in L level and the sampling signal is supplied as a clock signal, so that the output signal of the latch circuit 130, i.e. the received signal, is stored into the address specified in accordance with the distance.

Then, the transmission is performed given times, i.e. the counter 24 counts the three pulses from the oscillator 18, and the output terminal Q of the flip-flop 52 is H in level. At this time, the judging circuit 128 operates. Since the AND gate 136 is nonconductive, the output signal of the monostable multivibrator 140 is always L in level, so that the latch circuits 130 and 142 do not operate. Further, the output signal from the monostable multivibrator 140 is always L in level, the output signal from the NAND gate 148 is always in H level. Accordingly, the memory 124 is in a read mode, and the buffer 150 is in non-operating mode. The signal read out from the memory 124 and the output signal from the A/D converter 126 are supplied to the judging circuit 128 where those are compared as in the previous embodiments. When those are not coincident with each other, the signal in H level is produced from the judging circuit 128 and the voice synthesizer 58 produces an alarm. Of the signals read out from the memory 124, only the signal with the level above the reference level is extracted from the level detector 152, and the extracted one is supplied to the judging circuit 128. Therefore, the level variation of the signal in the A/D converter 126, latch circuits 130 and 142, buffer 150, comparator 146, and memory 124 is omitted.

As described above, the third embodiment can detect an accurate state of the object by quantitizing the received signal by a plurality of bits. The present embodiment can of course detect only the given location, as shown in FIG. 6.

The present invention may be variously modified or changed within the scope of claims appended, not being limited to the above-mentioned embodiments. For example, the transmission waves may be infrared waves or microwaves.

What is claimed is:

1. An object detecting apparatus comprising:
   transmitting means for periodically radiating a signal wave into a region to be monitored;
   receiving means for receiving the signal wave radiated from said transmitting means and reflected from the monitored region to produce a received signal;
   means for sampling the received signal from said receiving means at predetermined time intervals to produce a pulse train signal wherein the time between the pulses in the pulse train signal is proportional to the distance from the transmitting means of a detected object in said region;
   means for storing the pulse train signal produced by said sampling means as a reference pulse train signal; and
   judging means for comparing the pulse train signal from said sampling means at each period of transmission of said transmitting means with the reference pulse train signal previously stored in said storing means to detect a change in position of said detected object.

2. An object detecting apparatus according to claim 1, in which said transmitting means includes first oscillator means for producing an output signal of a first frequency, and second oscillator means for oscillating at a second frequency higher than the first frequency, said second oscillator means oscillating during a predetermined period from the leading edge of the output signal from said first oscillator means.

3. An object detecting apparatus according to claim 2, in which said sampling means includes timing signal generator means for generating a sampling pulse signal with a pulse width not longer than the predetermined period during which said second oscillator means oscillates, and sample & hold means for sampling and holding the received signal in response to the sampling pulse signal.

4. An object detecting apparatus according to claim 1, in which said storing means includes comparator means for comparing a level of the pulse train signal from said sampling means with a reference level, a memory which is in a write mode until a given number of radiations of said transmitting means occurs and is in a read mode after the given number of radiations is reached, and gating means for selectively supplying the output signal from said comparator means to said memory until the given number of radiations is reached and supplying said pulse train signal to said judging means after the given number of the radiations is reached, and wherein said judging means produces a detecting signal when the pulse train signal from said sampling means is different from that stored in said memory.

5. An object detecting apparatus according to claim 1, in which said storing means includes analog comparator means for comparing a level of the pulse train signal from said sampling means with a predetermined reference level, analog to digital converter means for periodically converting the pulse train signal from said comparator means into a digital signal, first and second latch circuits connected to the output terminal of said analog to digital converter means successively in series, digital comparator means for comparing the output signals from said first and second latch circuits to produce an output signal when the output signal from said first latch circuit is larger then that of said second latch circuit, and a memory connected to the output terminal of said second latch circuit and set in a write mode by the output signal from said digital comparator, and wherein said judging means is set in a non-operating mode until a given number of radiations from said transmitting means is reached, and compares the output signal from said analog to digital converter means with the signal stored in said memory to produce a detecting signal when the signals are different from each other.

6. An object detecting apparatus according to claim 1, in which said judging means compares the corresponding pulse train signal from said sampling means with the signal in said storing means at the time of a given sampling.

7. An apparatus as in claim 1 wherein said judging means comprises means for selecting, from said pulse train signal and said reference pulse train signal, information corresponding to distances from the transmitting means to detected objects which are greater than a first predetermined distance and less than a second predetermined distance.

8. An apparatus as in claim 1 wherein said judging means includes means for sequentially comparing the time between successive pulses in said pulse train signal produced by said sampling means with corresponding timing data of the reference pulse train signal stored in said storing means.

9. An apparatus as in claim 1 wherein said storing means includes means for storing the maximum level of said pulse train signal obtained during a plurality of periods of radiation by said transmitting means as said reference pulse train signal.

10. An apparatus as in claim 9 wherein said storing means comprises:
    means for comparing the pulse train signal produced by said sampling means with the reference pulse train signal stored by said storing means; and
    means for storing the pulse train signal produced by said sampling means in place of said stored reference pulse train signal when the pulse train signal is larger than the stored reference pulse train signal.

11. An apparatus as in claim 1 wherein said storing means includes means for combining said pulse train signal received from said sampling means with a stored pulse train signal previously received from said sampling means and stored in said storing means, said combined signals being stored in said storing means.

12. An apparatus as in claim 11 wherein said means for combining includes means for superposing said pulse train signal received from said sampling means with said stored reference pulse train signal.

13. An object detecting apparatus comprising:
transmitting means for transmitting signals into a region to be monitored;
receiving means for receiving said signals radiated from said transmitting means and reflected from said monitored region;
means for periodically sampling said received signals;
memory means for storing a series of said sampled signals as a series of reference signals; and
comparing means for producing an alarm signal when said reference signals and a subsequent series of sampled signals are different from one another, whereby a change in the state of said monitored region is detected, wherein said comparing means includes
first means for sequentially periodically comparing each of said reference signals with a corresponding one of said sampled signals, said subsequent series of alarm signal being produced when a reference signal and a corresponding sampled signal are different, and
second means for selecting ones of said reference signals and said sampled signals to be compared so that said change of the state of said monitored region is associated with a predetermined range of distances.

14. An object detecting apparatus comprising:
transmitting means for transmitting signals into a region to be monitored;
receiving means for receiving said signals radiated from said transmitting means and reflected from said monitored region;
means for periodically sampling said received signals;
memory means for storing a series of said sampled signals as a series of reference signals; and
comparing means for producing an alarm signal when said reference signals and a subsequent series of sampled signals are different, whereby a change in the state of said monitored region is detected,
wherein said comparing means includes means for selecting information contained in said sampled signals and said reference signals corresponding to objects existing in said region within a predetermined selected range of distances from said transmitting means, said comparing means comparing only said information corresponding to said selected range of distances.

* * * * *